F. GAHM.
ENGINE STARTER.
APPLICATION FILED AUG. 14, 1912.
1,080,335.
Patented Dec. 2, 1913.
2 SHEETS—SHEET 1.
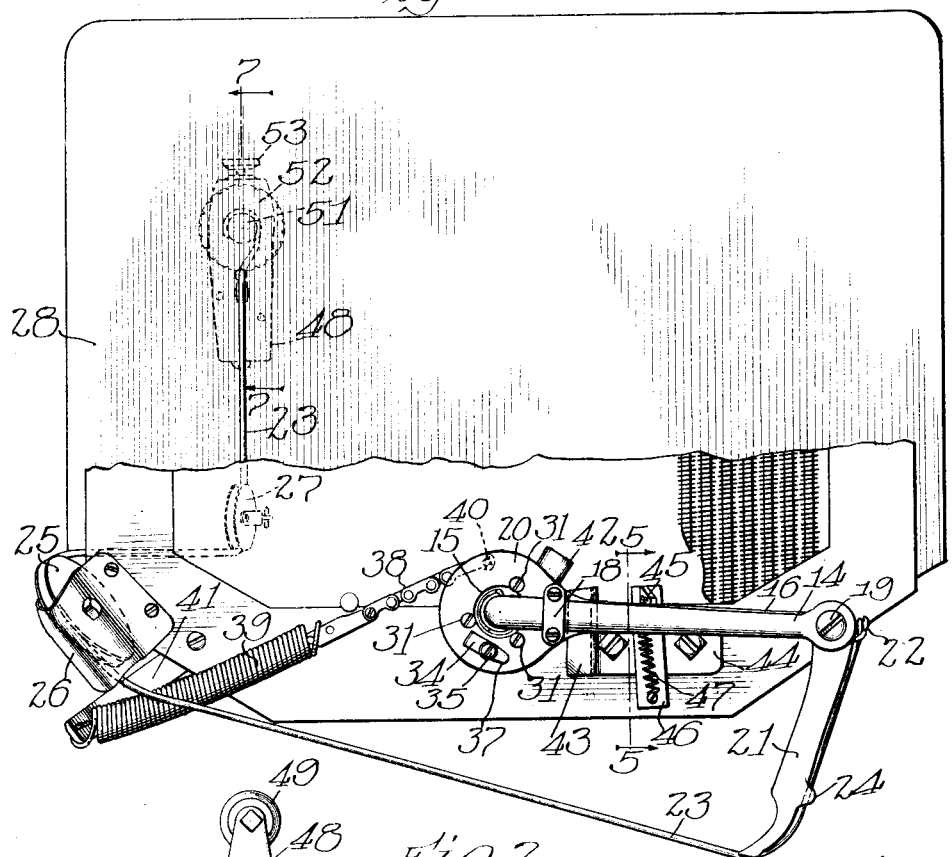
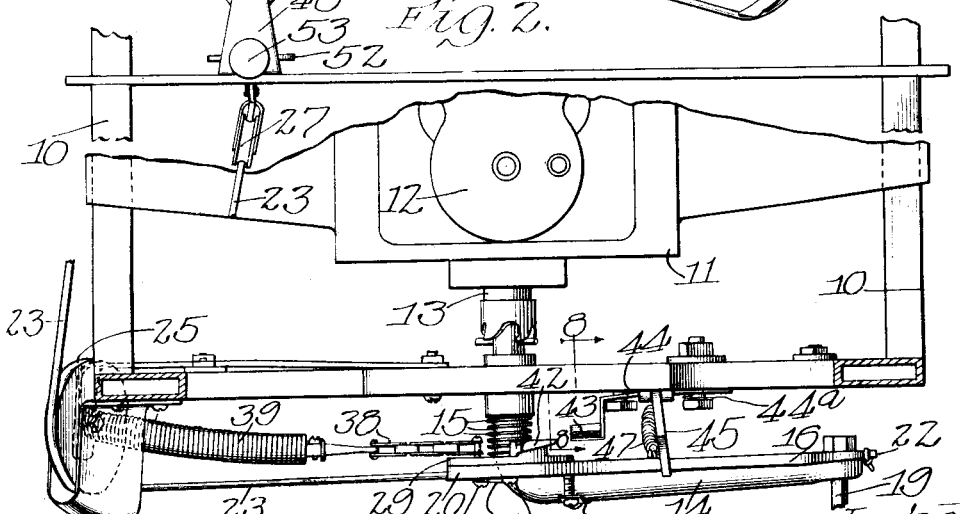

F. GAHM.
ENGINE STARTER.
APPLICATION FILED AUG. 14, 1912.
1,080,335.
Patented Dec. 2, 1913.
2 SHEETS—SHEET 2.
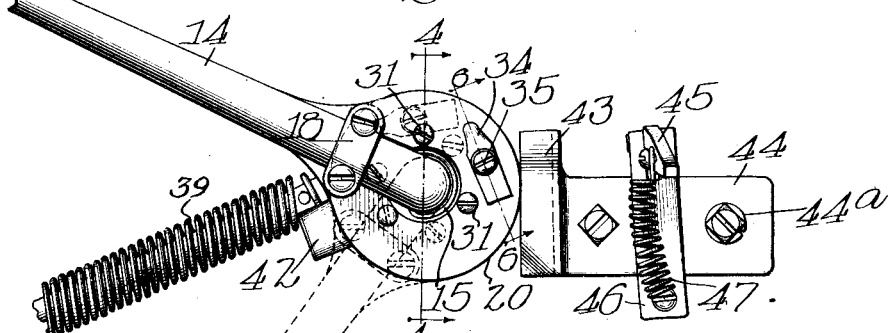
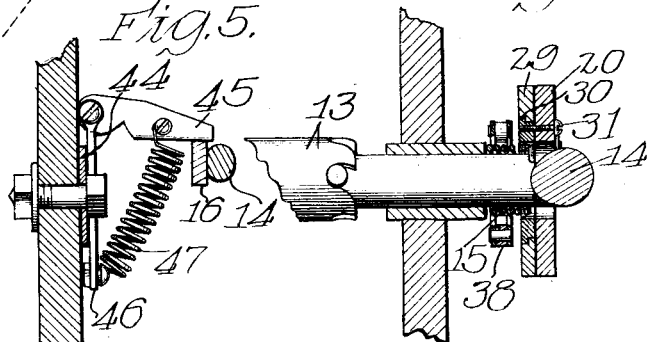
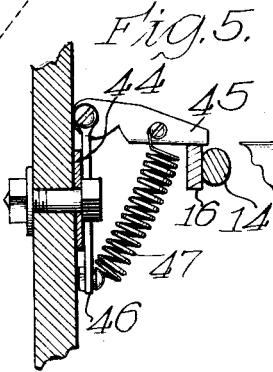
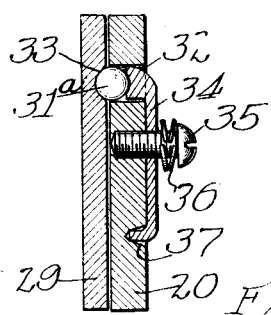
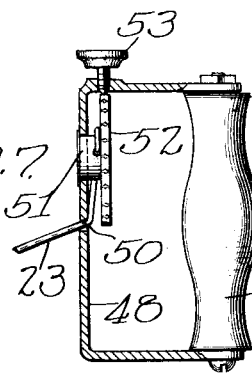
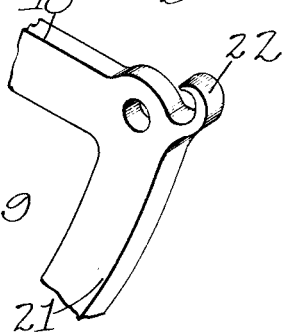
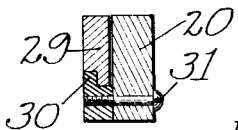
Witnesses:
G. W. Dmarus Jr.
R. Bauerle
Inventor
Frank Gahm
by Adams & Jackson
Attys.

UNITED STATES PATENT OFFICE.

FRANK GAHM, OF STREATOR, ILLINOIS.

ENGINE-STARTER.

1,080,335.  Specification of Letters Patent.  Patented Dec. 2, 1913.

Application filed August 14, 1912. Serial No. 714,995.

*To all whom it may concern:*

Be it known that I, FRANK GAHM, a citizen of the United States, residing at Streator, in the county of La Salle, in the State of Illinois, have invented certain new and useful Improvements in Engine - Starters, of which the following is a specification, reference being had to the accompanying drawings.

This invention relates to improved means for starting engines and is particularly designed for use in connection with the engine of an automobile.

It has for its leading object to provide novel mechanism so connected with the usual starting crank at the forward end of the engine's crank-shaft that the operator, while seated in the machine, can cause such crank to be given a quick partial rotation, such as would ordinarily be given if the operator were on the ground and turning the crank by hand, and as such crank is moved to make such partial rotation will force its inner or hub end inward into the required clutching engagement with the crank-shaft, and upon the reverse rotation of the crank to its normal position will force such inner or hub end out of said clutching engagement.

Another object is to so attach my improved mechanism to the said starting crank as to permit such crank to be operated by hand in the customary way if desired without the operator being required to take the time to first disconnect any portion of my improved mechanism from the said crank or otherwise manipulate it or give it attention.

These objects I attain by the construction and arrangement of parts illustrated in the drawings and hereinafter particularly described.

That which I believe to be new will be set forth in the claims.

Referring to the drawings,—Figure 1 is a front elevation of my improved mechanism applied to an automobile; Fig. 2 is a plan view of the same, the framework of the automobile being partly broken away; Fig. 3 is an enlarged detail being a front elevation of the starting-crank and attached parts, the crank being shown as having been given a partial rotation; Fig. 4 is a vertical section taken at line 4—4 of Fig. 3; Fig. 5 is a vertical section taken at line 5—5 of Fig. 1; Fig. 6 is a vertical section taken at line 6—6 of Fig. 3; Fig. 7 is a view partly in side elevation and partly in section of the handle for the operator and to which the flexible connection is attached for transmitting the pull on the handle to the starting-crank; Fig. 8 is a vertical section taken at line 8—8 of Fig. 2; Fig. 9 is a perspective view of a portion of the angular bar carried by the starting crank; and Fig. 10 is a section through the annular head of the bar carried by the starting-crank and the ring at the inner face of such head.

In the several figures of the drawings in which corresponding parts are indicated by like reference characters, 10 indicates a portion of the frame of an automobile of any approved construction.

11 indicates a portion of the engine supporting frame, 12 a portion of the engine and 13 indicates the engine shaft, the forward end of which is notched in the customary manner so that an ordinary starting-crank may be forced into temporary clutching engagement therewith.

14 indicates an ordinary starting-crank provided around that end that passes through the front of the machine with the usual coiled spring 15 to normally hold the shaft-engaging end of the starting crank away from locking engagement with the engine-shaft.

16 indicates a bar lying alongside of and suitably secured to the starting-crank 14. In the construction shown it is secured to the starting-crank by a clip 18 near the inner end and near the outer end by the long bolt 19 which forms the handle-piece of the starting-crank, such bolt ordinarily being provided with a wooden or hard rubber hand grip, not shown. The inner end of this bar 16 is enlarged to form an annular head, indicated by 20, which head has formed in it a large central opening to adapt it to be slipped over the starting-crank so as to bring the bar into position alongside of the main portion of the starting - crank preparatory to being affixed thereto as described. The securing clip 18 referred to is held in place, as shown in Fig. 1, by screws or bolts passing into this head portion 20. At the outer end of the bar 16 is provided an angular extension 21 which, when the parts are in their normal or inactive position, extends downward from the bar and is preferably somewhat curved toward the said head portion 20. The main body of the bar 16 and said extension 21 are preferably formed in a single piece, as best shown in Fig. 9. As also best shown in this Fig. 9, at the upper corner of the angular piece 16—21 is provided a hook 22 which is adapted to be engaged by a loop on the end of the flexible connection 23, preferably a steel rope. This flexible connection extends down along the outer edge of the extension 21, being held in place either by a groove in such edge or by projecting ears 24, as shown, or otherwise, and from the end of such extension it is carried across to the other side of the machine and led over a suitable pulley 25, secured in an ordinary pulley block 26 attached to the machine near one corner thereof, and thence conducted back and passed through the dash-board of the machine where it is secured to a handle within easy reach of the chauffeur. It is to be guided by one or more suitable pulleys in addition to the pulley 25, one such additional pulley being indicated in dotted lines in Fig. 1 and marked with the numeral 27. The operating handle referred to is best located against the dash-board, as indicated in Fig. 1, but of course may be otherwise located within easy reach of the chauffeur if so desired. The dash-board as shown is indicated by 28. The handle referred to will be more particularly described hereinafter.

29 indicates a ring that fits against the inner face of the head portion 20 and is held thereto by a smaller ring 30 that fits in a recess in the face of the ring 29 (see Fig. 10), said ring 30 and head 20 being secured together by screws 31 as shown. The ring 29 is compelled to rotate with the head 20 by means of a ball-clutch 31ª inserted through an opening 32 in the head 20 and projecting into a shallow socket 33 in the adjacent face of said ring 29. This ball 31ª is held in position by the inturned end of a short plate 34 through which plate between its ends passes a screw 35 between the head of which and the face of the short plate 34 are yielding spring washers 36 or, what would be the mechanical equivalent thereof, a short coiled spring. The other end of the plate 34 is, as clearly shown in Fig. 6, turned down and lies in a suitable shallow depression 37 in the face of the head 20. It is evident that from this construction the ring 29 will turn with the head 20 until such time as the restraining weight or pull exerted, as hereinafter described, on the ring 29 overbalances the pressure tending to force the ball 31ª inward. In that event the continued rotation of the head 20 will cause the ball to be forced out of its socket 33 against the pressure of the split washers 36, or the equivalent spring that may be substituted therefor. The restraining influence on this ring 29 that will cause it to remain stationary while the head 20 of the arm 16 may continue to rotate with the starting-crank is caused by the winding up on that portion of the crank that projects into the machine of a spring-pulled chain 38, which chain is attached at one end to a pin 40 projecting from the face of the ring 29. The spring connected to the other end of this chain 38 is indicated by 39 and is attached in any suitable manner to the frame of the machine. As shown, such spring is connected to an arm or bracket 41.

42 indicates a finger carried by the ring 29 and preferably cast therewith, said finger projecting beyond the periphery of said ring.

43 indicates a guide attached to the front of the machine in such position as to be hit by the finger 42 immediately after the starting crank has commenced to rotate. This guide at its upper end is curved outward and as the finger hits such curved end and continues down during the rotation of the crank it will cause such finger to be forced inward and, of course, draw inward against the force of the coiled spring 15 the starting-crank and the bar attached thereto, thus causing an engagement of the starting-crank with the engine. The operation of the machine as a whole will be more fully described hereinafter. The guide 43, in the construction shown, consists of a piece of heavy sheet metal suitably bent and formed with a base portion 44 that is secured to the front of the automobile. In securing it in place I deem it best to bend that portion of the base adjacent to the guide portion so that the base at that portion stands out a little from the machine, as clearly shown in Fig. 2, the securing bolts or screws not being tightened up fully and thereby a little play is allowed the guide. This play is of importance on the return of the starting-crank, because when such starting-crank comes back the finger 42 will strike the inwardly turned lower end (see Fig. 8) of the guide 43 and move up in contact with the outer face of such guide. Inasmuch as the upper end of the guide is curved out as shown it is necessary that this play or movement of the guide, as a whole, be permitted. The guide upon being forced inward by the upward movement of the finger compresses the split spring washer 44ª (see Fig. 2) and when the finger has passed beyond the upper end of the guide the guide will then spring outward slightly so as to be again in position to have the finger engage it on its under face at the next partial rotation given to the starting-crank.

45 indicates a dog pivoted at its inner end to a suitable support which, in the construction shown, is a plate 46 extending across the base piece 44. This dog extends forward over the starting-crank 14 and attached bar 16.

47 indicates a coiled spring secured at its upper end to the central portion of the dog 45 and at its lower end, in the construction shown, to the lower end of the plate 46. The dog serves as a yielding stop against which the starting-crank comes when it is brought back into its normal non-operative position by the power of the spring 39.

The operator's handle, that has been hereinbefore referred to, to which one end of the flexible connection 23 is attached is best shown in Fig. 7. It consists as there shown of a metal strip bent to form a three sided frame 48 between the ends of which is secured a handle proper 49. Through the forward wall of the frame 48 is a small opening 50 through which passes the flexible connection 23. Above this opening 50 is journaled a small reel 51 having secured to it at its inner end a disk 52, and through the upper wall of the frame 48 is screw-threaded a set-screw 53 adapted to bear against the periphery of said disk 52 to lock such disk in any adjusted position—the periphery of the disk being preferably recessed at intervals as shown to receive the end of the said set-screw. The end of the flexible connection is secured to the reel 51 and suitably tightened thereon by turning the disk and reel and when drawn sufficiently tight the disk is locked in position by the turning of the set-screw.

The operation of the device is as follows:—With the parts in position, as shown in Figs. 1 and 2, the occupant of the machine when desiring to start the engine will give a quick pull on the handle and thereby, through the flexible connection 23, will give a partial rotation to the starting-crank 14— such partial rotation corresponding in extent to the amount of partial rotation usually given when the said crank is started in the usual method directly by hand. As the crank is moved the finger 42 strikes the inclined upper end of the guide 43 and by such guide will be forced inward compelling, of course, an inward movement also of the crank against the force of the coiled spring 15 and cause an engagement of such crank in the usual manner with the engine-shaft, which engagement will be maintained while the crank continues to the limit of its motion in that direction. As before explained, the ring 29 will be caused to turn with the starting-crank owing to its frictional engagement therewith through the medium of the ball-clutch 31ª. Substantially half a revolution will be given the crank-shaft by the pull on the handle 48—49 as described and at the completion of such amount of movement the chain 38 will have been wrapped around the spindle portion of the starting crank or, to be more exact, upon the coiled spring 15 that surrounds such portion of the starting-crank, as shown in Fig. 4. At this time the coiled spring 39 will have been expanded and drawn out so that its end is close to the periphery of the head 20 and ring 29 and will be exerting such a pull on the parts that it will return the starting crank to its initial position immediately upon the release of the operator's pull on the handle 48—49. Immediately upon the commencement of the return movement of the starting-crank the crank will disengage itself from the engine-shaft, owing to the shape of the clutch-members, and the aid of the then uncoiling spring 15, and when the starting-crank has rotated backward sufficiently far for the finger 42 to engage the guide 43 it will be directed along the outside of such guide owing to the curving of the lower end of the guide, as best seen in Fig. 8, and thereby the danger avoided of causing an undesired engagement between the starting-crank and the engine-shaft as would be the case if the finger traveled up against the inner face of the guide. As the finger on this return movement bears against the outwardly curved upper end of the guide such guide is enabled to yield inwardly to allow the finger to proceed owing to the yielding manner, hereinbefore described, in which the base-plate of the guide is attached in place. As the finger passes above the guide the guide base springs out again slightly so as to bring the guide itself in proper position to be hit by the finger at the next forward rotation of the starting-crank. The partial rotation and reverse rotation thus described can be repeated rapidly by the giving of the required number of pulls on the operator's handle and the engine started in exactly the same way as if the operation were performed by the application of hand power direct to the starting-crank.

It is evident that if it is at any time desired to crank the engine in the usual way that it can be done without the removal, alteration or unfastening of any of the parts, as the added parts in no wise interfere with the free operation of the starting-crank by the operator while in front of the machine. If the crank should be completely rotated the pivoted dog 45 will be struck on its upper edge of course as the crank nears the completion of its full rotation, but will readily yield to allow the crank to pass and as soon as the crank has passed it will spring back at once into position and be again ready to serve as a stop to hold the crank in its normal non working position.

As suggested in the preceding paragraph, it is sometimes deemed desirable to give the starting-crank one or more complete revolutions and that can be done in the usual way, but, of course in that event the flexible connection 23 will have to be disconnected from the hook 22. If not so disconnected before the operator commences to use the crank it will automatically be disconnected when the crank has been turned to something more than half a revolution as the loop on the end of such flexible connection will then simply fall off of the hook when the starting-crank has been turned around far enough. It is only when the starting-crank is to be completely rotated that the head 20 will rotate independently of the ring 29, in the manner hereinbefore explained, and such independent rotation will not commence until after the crank has passed beyond the usual substantially-half rotation. As it passes beyond such partial rotation the ball-clutch 31ᵃ will be forced out of its socket 33, as before explained, but will bear with sufficient friction against the inner face of the ring 29 to hold such ring stationary against the pull of the then expanded spring 39.

The starting-crank 14 and the arm 16 have been described as separate parts firmly connected together and I prefer that construction inasmuch as I thereby have a mechanism that can be sold independently of the machine and quickly applied to any ordinary make of machines, but it is evident that if so desired the starting-crank and said bar might be made of a single piece without departing from the spirit of my invention.

What I claim as my invention and desire to secure by Letters Patent is—

1. The combination with an engine-shaft and a starting-crank adapted to engage the same, of a flexible connection connected at one end with said crank and adapted upon power being applied to it to rotate said crank, said flexible connection being automatically detachable from engagement with the crank after a partial rotation of the crank, and means for forcing said crank into engagement with the engine-shaft when said crank is rotated in one direction, said means comprising a finger connected with said crank and projecting from the inner end portion thereof and a guide attached to a fixed support and adapted to be engaged by said finger when the crank is rotated.

2. The combination with an engine-shaft and a starting-crank therefor, of a head connected with said crank and surrounding the inner end portion thereof that engages the engine-shaft, a flexible connection connected with said crank and adapted when pulled to rotate said crank, a finger connected with said head and projecting beyond the periphery thereof, a guide adapted to be engaged by said finger when said crank and head are rotated, such engagement causing the said crank to be moved into engagement with said engine-shaft.

3. The combination with an engine-shaft, a starting-crank therefor and a finger connected with and movable with said crank, of a guide in the path of said finger adapted to be engaged on one of its sides by the finger when the crank rotates in one direction and be engaged on its opposite side by the finger during the reverse rotation of the crank, means for permitting the guide to yield during the second-named engagement, a flexible connection connected with said crank and adapted when pulled to rotate said crank, and means for reversely rotating said crank to bring it to its original position.

4. The combination with an engine-shaft, a starting-crank therefor and a finger connected with and movable with said crank, of a guide attached to a fixed support and adapted to be engaged by said finger when said crank is rotated and move the inner end of the crank toward and into clutching engagement with said shaft, a flexible connection connected with said crank and adapted when pulled to rotate said crank, a spring acting to return said crank to normal position after the pull on said connection has been released, and a stop against which the said crank abuts and is brought to rest.

5. The combination with an engine-shaft, a starting crank therefor, and a head connected therewith and surrounding the inner end portion thereof that engages the engine-shaft, of a ring at one side of said head, yielding means for attaching said ring and head together, a finger connected to said ring, a guide adapted to be engaged by said finger when said crank, head, and ring are rotated, such engagement causing the crank to be moved into clutching engagement with said engine-shaft, a flexible connection connected with said crank and adapted when pulled to rotate said crank, and a spring connected at one end to a suitable support and at the other end connected with said ring.

6. The combination with an engine-shaft and a starting-crank therefor, of a bar extending alongside of said crank and secured thereto, said bar having at its inner end a head portion, a ring at one side of said head portion, means for yieldingly securing said head portion and ring together, a finger carried by said ring, a guide adapted to be engaged by said finger during the rotation of said crank and cause a clutching engagement of the inner end of the crank with the engine-shaft, a flexible connection attached to said arm and adapted when pulled to rotate said crank and parts connected therewith, a chain attached to said ring, and a spring connected to and exerting a pull upon said chain and adapted to return said crank to its normal or inoperative position when the pull on said flexible connection is released.

7. The combination with an engine-shaft and a starting-crank therefor adapted to be rotated by the direct application of hand-power thereto, of a ring, means for yieldingly connecting said ring and crank so that they will move together for a portion only of the crank's rotation, means for compelling a clutching engagement of the crank with the engine-shaft when the crank is rotated in engine-starting direction, auxiliary means for partially rotating the crank by power applied at a distance therefrom, said means comprising a flexible connection automatically detachable from connection with the crank before the crank has made a complete rotation, and means for holding said ring against rotation with the crank after a partial rotation of the crank.

FRANK GAHM.

Witnesses:
F. M. POWERS.
H. M. JONES.

Copies of this patent may be obtained for five cents each, by addressing the "Commissioner of Patents Washington, D. C."